United States Patent [19]

Taylor

[11] 4,038,228

[45] July 26, 1977

[54] DEGRADABLE PLASTIC COMPOSITION CONTAINING A TRANSITION METAL SALT OF A HIGHLY UNSATURATED ORGANIC ACID

[75] Inventor: Lynn J. Taylor, Haslett, Mich.

[73] Assignee: Owens-Illinois, Inc., Toledo, Ohio

[21] Appl. No.: 724,666

[22] Filed: Sept. 20, 1976

Related U.S. Application Data

[63] Continuation of Ser. No. 200,593, Nov. 19, 1971, abandoned.

[51] Int. Cl.$^2$ .................................................. C08J 3/20
[52] U.S. Cl. .............................. 260/23 AC; 260/18 R; 260/18 N; 260/23 AR; 260/23 XA; 260/23 S; 260/23 H; 260/23.7 R; 260/DIG. 43; 526/4; 536/64; 536/58; 536/95; 536/84
[58] Field of Search ....... 260/23 AC, 23 AR, 23 XA, 260/23 S, 23 H, 18 R, 18 N, 23.7 R, DIG. 43; 526/4; 536/64, 58, 95, 84

[56] References Cited

U.S. PATENT DOCUMENTS

| | | | |
|---|---|---|---|
| 2,267,778 | 12/1941 | Yngve | 260/45.75 R |
| 2,462,331 | 2/1949 | Myers | 260/45.75 R |
| 2,711,401 | 6/1955 | Lally | 260/45.75 R |
| 2,784,167 | 3/1957 | Schneider et al. | 260/45.75 R |
| 2,935,485 | 5/1960 | Reynolds | 260/45.75 R |
| 2,984,634 | 5/1961 | Caldwell | 260/45.75 N |
| 3,432,514 | 3/1969 | Cash, Jr. et al. | 526/4 |
| 3,454,510 | 7/1969 | Newland et al. | 260/DIG. 43 |
| 3,592,792 | 7/1971 | Newland et al. | 260/41 |
| 3,657,114 | 4/1972 | Smith | 526/4 |
| 3,847,852 | 11/1974 | White et al. | 526/4 |

OTHER PUBLICATIONS

"Mechanisms of Oxidation of Organic Compounds" by Waters, Methuen & Co. Ltd., N. Y., 1964, pp. 6, 7, 13, 14, & 99.

*Primary Examiner*—Eugene C. Rzucidlo
*Attorney, Agent, or Firm*—Donald Keith Wedding

[57] ABSTRACT

There is disclosed a novel degradable plastic composition, said composition being degradable in the absence of electromagnetic radiation and consisting essentially of an organic polymer having dispersed therein at least one transition-metal derivative of at least one highly unsaturated organic acid, such as a tallate, linoleate, linolenate, etc. of one or more transition metals, particularly a transition metal such as cobalt, chromium, copper, iron, manganese, and nickel.

14 Claims, No Drawings

DEGRADABLE PLASTIC COMPOSITION CONTAINING A TRANSITION METAL SALT OF A HIGHLY UNSATURATED ORGANIC ACID

This is a continuation of application Ser. No. 200,593, filed Nov. 19, 1971, now abandoned.

BACKGROUND OF THE INVENTION

This invention relates to novel platic compositions having enhanced environmental degradability.

The advent of plastics has given rise to improved methods of packaging goods. For example, polyethylene and polypropylene plastic films, bags, bottles, styrofoam cups and blister packages have the advantages of being chemically resistant, relatively unbreakable, light in weight and translucent or transparent. The increasing use of plastics in packaging applications has created a serious waste disposal problem. Burning of these plastic materials is unsatisfactory since it adds to air pollution problems.

Unlike some other packaging materials, such as paper and cardboard, plastics are not readily destroyed by the elements of nature. Thus, burying them is not an effective means of disposal, and can be expensive.

Plastics are biologically recent developments, and hence are not easily degradable by micro-organisms which attack most other forms of organic matter and return them to the biological life cycle. It has been estimated that it may take millions of years for organisms to evolve which are capable of performing this function. In the meantime, plastic containers and packaging films are beginning to litter the country side after being discarded by careless individuals.

One means suggested for combating the plastic waste disposal problem has been the use of plastic compositions which degrade upon exposure to ultraviolet light. For example, reference is made to British patent specification No. 1,128,793, which describes ethylene-carbon monoxide copolymers which undergo rapid deterioration when subjected to natural sunlight or artificial sources of ultraviolet radiation.

The suggested use of ultraviolet-degradable polymeric compositions for packaging applications is attractive, in the sense that materials exposed to sunlight, such as roadside litter, will undergo accelerated environmental deterioration. However, the deterioration of such materials will not necessarily be rapid if they are not exposed to sunlight, as, for example, in the case of waste materials which are buried or covered by other materials in the course of waste disposal.

An alternative approach involves the use of oxygen, rather than sunlight, as the primary initiator of polymer degradation.

The enhancement of the rate of environmental deterioration of plastics through the use of oxidation-promoting additives is known in the prior art. For example, the preparation of degradable polyolefin films containing certain organic derivatives of transition metals is described in U.S. Pat. No. 3,454,510.

In the course of experimental investigations of the selective degradation of polyolefins, it was unexpectedly discovered that certain organic derivatives of transition metals display exceptional reactivity in promoting the non-photochemical degradation of polyolefins. An example is cobalt tallate, which is far more reactive than cobalt stearate in promoting the oxidative deterioration of polypropylene or polyethylene. Further experimentation established that transition-metal derivatives of highly unsaturated fatty acids (or fatty-acid mixtures) are generally much more effective pro-oxidants relative to the corresponding salts derived from saturated fatty acids, such as the stearates, or relatively less unsaturated fatty acids.

DESCRIPTION OF THE INVENTION

In accordance with this invention, a degradable plastic composition is prepared by the admixture of an organic polymer and an additive comprising at least one transition-metal derivative of at least one highly unsaturated organic acid.

Typical organic polymers (and copolymers) contemplated especially include polyethylene, polypropylene, poly(1-butene), poly(4-methy-1-pentene), ethylene-propylene copolymers, ethylene-1-butene copolymers, ethylene-1-hexene copolymers, ethylene-vinyl acetate copolymers, ethylene-ethyl acrylate copolymers, ethylene-acrylic acid copolymers and their salts, polystyrene, polyvinyl chloride, poly(vinylidene chloride), polyvinyl fluoride, poly (vinylidene fluoride), polyoxymethylene, poly(ethylene oxide), poly(propylene oxide), polyvinyl alcohol, polyvinyl acetate, polyvinyl formal, polyvinyl butyral, poly(methyl acrylate), poly-(ethyl acrylate), poly(caprolactam), poly(hexamethyleneadipamide), poly(ethylene terphthalate, vinyl chloride-vinyl acetate copolymer, stryrene-butadiene copolymers, styrene-isoprene copolymers, cellulose acetate, cellulose propionate, cellulose acetate butyrate, ethyl cellulose, methyl cellulose, hydroxyethyl cellulose, and hydroxypropyl cellulose. Preferred polymers include polyethylene, polypropylene, poly(4-methyl-1-pentene), polystyrene and polyvinylchloride.

The term 'transition metal' as used herein, should be understood to include elements 21 through 30, 39 through 48, 57 through 80, and 89 through 103 of the Periodic Table. In chemical terms these are elements having a partially filled inner shell of electrons. Preferred transition metals are cobalt, chromium, copper, iron, manganese, and nickel.

The term 'highly unsaturated organic acid' as used herein, may be defined as an organic caboxylic acid possessing more than one carbon-carbon double bond per carboxyl group. The carbon-carbon double bonds may be conjugated or unconjugated with respect to one another and to the carboxyl group. Typical examples of highly unsaturated organic acids, which might be employed for the preparation of transition-metal detivatives for use in accordance with this invention, include linoleic acid, linolenic acid, elaeostearic acid, parinaric acid, licanic acid, arachidonic acid, stillingic acid, 2,4-pentadienoic acid, sorbic acid, diallylacetic acid, geranic acid, 9,11-octadecadienoic acid, dehydrogeranic acid, clupanodonic acid, abietic acid, and pimaric acid.

It should be understood that transition-metal derivatives obtained from mixtures of organic acids may also be employed in the practice of this invention, provided such mixtures contain at least 10% by weight of highly unsaturated carboxylic acids. Typically, such mixtures are obtained from natural oils; for example, mixtures termed 'tall oil fatty acids' are obtained from tall oil. Other oils which contain substantial proportions of highly unsaturated organic acids or their esters, and thus may be employed for the preparation of suitable mixtures containing highly unsaturated organic acids, include corn oil, cottonseed oil, linseed oil, fish oil, peanut oil, soya bean oil, tung oil, menhaden oil, safflower oil, sunflower seed oil, oiticica oil, poppy seed oil, tobacco seed oil, niger seed oil, rubber seed oil, candle nut oil, perilla oil, stillingia oil, conophor oil, and lumbang oil.

The transition-metal derivatives of high unsaturated organic acids may be obtained as such, or they may be prepared by one or more of the following methods:

1. Reaction, in aqueous solution, of an alkali-metal salt of the organic acid, or mixture of organic acids, and a soluble salt of the transition metal;
2. Heating of the organic acids(s) with an oxide or acetate of the transition metal, or
3. Heating a natural oil with a transition-metal oxide or acetate.

Specific transition metal derivatives of highly unsaturated organic acids especially include the tallates, linoleates, linolenates, and resinates, particularly those of cobalt, chromium, copper, iron, manganese, and nickel.

The novel plastic compositions of this invention can be prepared by a number of methods. A preferred method consists essentially of heating the polymer at a temperature below its decomposition temperature, incorporating the additive transition-metal composition, and mixing the ingredients so as to obtain a substantially uniform mixture. The mixture can then be molded and cooled to form a solid molded article. In the alternative, the mixture can be extruded and cooled to form a solid extrudate. Conventional plastic processing equipment can be used for melting the polymer, mixing the polymer with the additive(s) and molding or extruding the resulting mixture. Processing conditions, such as temperature, time, and pressure, will be obvious to those skilled in the art.

Another preferred process for preparing the novel plastic compositions of this invention consist essentially of blending the additive(s) with a solid degradable polymer to obtain a substantially uniform mixture. The polymer is preferably in the form of pellets, granules or powder. Conventional plastic processing equipment can be used in the blending operation. The processing conditions will be obvious to those skilled in the art. The resulting mixture can be melted at a temperature below the decomposition temperature of the polymer and additive(s). The resulting melt can be extruded or molded and cooled to form a solid extrudate or molded article.

The novel plastic compositions of this invention can be prepared at the time of disposal of conventional plastic articles. For example, a plastic article can be crushed, milled or ground, and subsequently or simultaneously mixed with the additive(s).

A preferred process for preparing the novel plastic compositions of this invention consists essentially of casting a film from a composition of the additive(s) and a polymer in an inert solvent. By 'inert solvent'is meant that the solvent does not react with the polymer or additive(s). Use of this method is particularly attractive for preparing degradable coating or adhesive materials.

The additive(s) can also be applied as a solution, slurry, or paste to the surface of a plastic article. The coating composition can be applied by brushing, roller coating, spraying, dipping or printing on the surface or the article.

A composite container in which the polymer and photosensitizer are present in adjacent layers can also be constructed.

The novel degradable plastic compositions can also contain non-reactive additives. By the term 'non-reactive additives' is meant a chemical additive, filler, or reinforcement commonly used in the formulation of plastic compositions which does not materially interfere with the degradation process. For example, the compositions of this invention can contain additives and processing aids, viscosity depressants, mold-release agents, emulsifiers, and slip agents. The composition of this invention can also contain anti-oxidants, anti-static agents, and fibrous reinforcement which do not materially detract from the eventual degradation of the composition. The compositions of this invention can also contain fillers, such as barium sulphate, calcium carbonate, calcium silicate, fumed colloidal silica, glass, and clay.

Flame retardants, lubricants, plasticizers, adhesion promoters and stabilizers, such as those used to prevent thermo-oxidative decomposition can also be used. In some cases, it may be necessary to add an antioxidant or stabilizer to permit high-temperature processing, even though such additive may slow the degradation process. In other cases, it may be desirable to retard degradation for a limited period of time.

It is contemplated that the degradable plastic compositions of this invention will ordinarily contain about 90 to 99.99% by weight of the polymer, and 0.01 to 10.0% by weight of the transition-metal compound. It should be understood that non-reactive additives, such as those mentioned hereinbefore, are not to be considered in calculating these percentages.

The following examples represent some of the best embodiments contemplated by the inventor in the practice of this invention.

EXAMPLE 1

A polypropylene film, thickness ca. 0.003 inch, was prepared by casting from a solution of 15 g. unstabilized polypropylene (Profax 6401) and 1 ml. '6% cobalt tallate' in 150 ml. warm xylene. The film was stored in the dark at room temperature for 3 days. At the end of this period, extensive degradation was indicated by drastic embrittlement and by the appearance of a large carbonyl band in the infrared spectrum.

EXAMPLE 2

A polyethylene film containing cobalt tallate was prepared in the manner described in Example 1. The film was stored three days in the dark, in air, at room temperature. At the end of this period, significant degradation was indicated by the appearance of a substantial carbonyl band in the infrared spectrum.

I claim:

1. As a composition of matter, a plastic composition which is degradable in the absence of electromagnetic radiation and consisting essentially of an organic polymer having dispersed therein at least one transition-metal salt of at least one highly unsaturated organic acid.
2. The composition of claim 1 wherein the transition-metal is selected from one or more of the elements 21 through 30, 39 through 48, 57 through 80, and 89 through 103 ot the Periodic Table.
3. The composition of claim 1 wherein the transition-metal is selected from cobalt, chromium, copper, iron, manganese, and nickel.
4. The composition of claim 1 wherein the organic acid is an organic carboxylic acid possessing more than one carbon-carbon double bond per carboxyl group.
5. The composition of claim 1 wherein the organic acid is selected from the group consisting of linoleic acid, linolenic acid, elaeostearic acid, parinaric acid, licanic acid, arachidonic acid, stillingic acid, 2,4-pentadienoic acid, sorbic acid, diallylacetic acid, geranic acid, 9,11-octadecadienoic acid, dehydrogeranic acid, clupanodonic acid, abietic acid, and pimaric acid.

6. A process for preparing a plastic composition which is degradable in the absence of electromagnetic radiation, which process comprises dispersing into an oraganic polymer at least one transition-metal salt of a least one highly unsaturated organic acid.

7. The process of claim 6 wherein the salt is selected from the group consisting of tallates, linoleates, linolenates, and resinates of transition metals.

8. The process of claim 7 wherein the transition-metal is selected from the group consisting of cobalt, chromium, copper, iron, manganese, and nickel.

9. The process of claim 6 wherein there is dispersed about 0.01 to about 10 percent by weight of the transition-metal salt based on the total amount of polymer plus salt.

10. The process of claim 9 wherein the organic polymer is selected from the group consisting of polyethylene, polypropylene, poly(1-butene), poly(4-methyl-1-pentene), ethylene-propylene copolymers, ethylene-1-butene copolymers, ethylene-1-hexene copolymers, ethylene-vinyl acetate copolymers, ethylene-ethyl acrylate copolymers, ethylene-acrylic acid copolymers and their salts, polystyrene, polyvinyl chloride, poly(vinylidene chloride), polyvinyl fluoride, poly (vinylidene fluoride), polyoxymethylene, poly(ethylene oxide), poly(propylene oxide), polyvinyl alcohol, polyvinyl acetate, polyvinyl formal, polyvinyl butyral, poly(methyl acrylate), poly(ethyl acrylate), poly(caprolactam), poly(hexamethyleneadipamide), poly(ethylene terphthalate), vinyl chloride-vinyl acetate copolymers, styrene-butadiene copolymers, styrene-isoprene copolymers, cellulose acetate, cellulose propionate, cellulose acetate butyrate, ethyl cellulose, methyl cellulose, hydroxyethyl cellulose, and hydroxypropyl cellulose.

11. As an article of manufacture, a plastic body comprising an organic polymer having incorporated therein at least one transition-metal salt of at least one highly unsaturated organic acid such that the plastic material is degradable in the absence of electromagnetic radiation.

12. The article of claim 11 wherein the polymer is selected from polyethylene, the group consisting of polypropylene, poly(4-methyl-1-pentene), polystyrene, and polyvinylchloride.

13. The article of claim 12 wherein the body is a container.

14. The article of claim 12 wherein the body is a film.

* * * * *